United States Patent [19]

Dianda

[11] Patent Number: 4,813,921
[45] Date of Patent: Mar. 21, 1989

[54] BELT TRANSMISSION UNIT FOR SELF-PROPELLED VEHICLES, PROVIDED WITH ENGINE START-UP DEVICE

[75] Inventor: Aldo Dianda, Lucca, Italy

[73] Assignee: Piaggio & C. S.p.A., Genova, Italy

[21] Appl. No.: 139,669

[22] Filed: Dec. 30, 1987

[30] Foreign Application Priority Data

Feb. 27, 1987 [IT] Italy ................... 19533 A/87

[51] Int. Cl.⁴ .............................. F16H 55/56
[52] U.S. Cl. ......................... 474/8; 474/133; 74/6
[58] Field of Search ............... 474/8, 101, 109, 111, 474/133; 74/6; 123/185 C, 185 CA; 280/151

[56] References Cited

U.S. PATENT DOCUMENTS 3,227,236 1/1966 Burton .................... 74/6 X
4,627,228 12/1986 Wolf ....................... 474/133 X Primary Examiner—William P. Neuder
Attorney, Agent, or Firm—Diller, Ramik & Wight

[57] ABSTRACT

A transmission unit for self-propelled vehicles, comprising two pulleys, i.e., a driving pulley and a driven pulley, with variable pitch, connected to each other by a transmission belt, is provided with an engine start-up device with an actuation group acting downstream the driven pulley; such an actuation group causes, at start-up time, the jockey element to act on the transmission belt, for the purpose of recovering possible slack of the belt; furthermore, lock elements, disengageable by centrifugal force, are provided, which mutually constrain, at start-up time, the two half-pulleys which compose the driven pulley, for the purpose of preventing the belts from wedging themselves between the same half-pulley.

20 Claims, 3 Drawing Sheets

BELT TRANSMISSION UNIT FOR SELF-PROPELLED VEHICLES, PROVIDED WITH ENGINE START-UP DEVICE

The present invention relates to a belt transmission unit for self-propelled vehicles, provided with an engine start-up device.

It is known that a fairly high percentage of low-range self-propelled two-wheelers are presently equipped with speed variator; such a variation is particularly useful for this category of vehicles, in as much as it allows the engine-wheel transmission ratio to be automatically fitted to the required load conditions, avoiding the use of the traditional change gear, which would result in excessively penalizing from both viewpoints of economy and use simpleness.

The above-said variators are generally of the "V" belt, variable-pitch-pulleys type and are controlled by the use of a centrifugal-mass speed governor which acts on one of the two pulleys, in the sense of increasing the wheel rpm/engine rpm ratio with increasing speeds of driving shaft.

The engine start-up device, in the above said vehicles, consists generally of a mechanical drive, by a pedal level, which acts directly on the main transmission shaft; in some cases, it may also consist of a drive of electrical type, but, in any case, always acting on the main shaft.

On the other hand, the driven pulley-side engine start-up, obtained, i.e., by applying the necessary torque for the start-up downstream the driven pulley, which, during this action, becomes hence the driving pulley, may become necessary when, due to particular architectures of the engine and the vehicle, having direct access to the main shaft is not possible.

But, in this case, the belt transmission system gets interposed between the driving shaft and the shaft to which the start-up action is applied, and this fact may lead to drawbacks.

It may happen, in particular, that the belt wedges itself between the two half-pulleys of the driven pulley; furthermore, an excessive slack arises in the belt relative to the pulleys, deriving from the necessary reversing of the working stretches of the belt during the start-up step relative to the normal operation step.

The purpose of the present invention is to propose a belt transmission unit for vehicles, provided with an engine start-up device, so structured as to allow the engine to be started up by acting downstream of the driven pulley, without any of above drawbacks occurring.

Such a purpose is achieved by means of a belt transmission unit for vehicles, provided with an engine start-up system, which comprises a driving pulley and a driven pulley connected with each other by means of a transmission belt, each of said pulleys being composed by two half-pulleys axially movable relatively to each other, and furthermore comprising an actuation group for engine start-up, characterized in that it is provided with a jockey element able to tighten the above said transmission belt, said actuation group being kinematically connected for revolution with one of the two half-pulleys of the driven pulley, and being furthermore connected with the jockey element in such a way that, in its position of engine start-up, it actuates said jockey element, and in that it is furthermore provided with at least one lock element rotatably and axially integral and radially sliding by centrifugal force, relatively to one of the two half-pulleys of the driven pulley, said lock element constraining, when said centrifugal force has zero value, said half-pulleys to each other, so to prevent the two half-pulleys from getting axially spaced apart from each other, and moving radially away from its constraint position with increasing values of said centrifugal force.

Hereunder, an exemplifying non-limitative form of practical embodiment of the present invention is shown, illustrated in the hereto attached drawing tables, wherein.

Figures 1, 4:
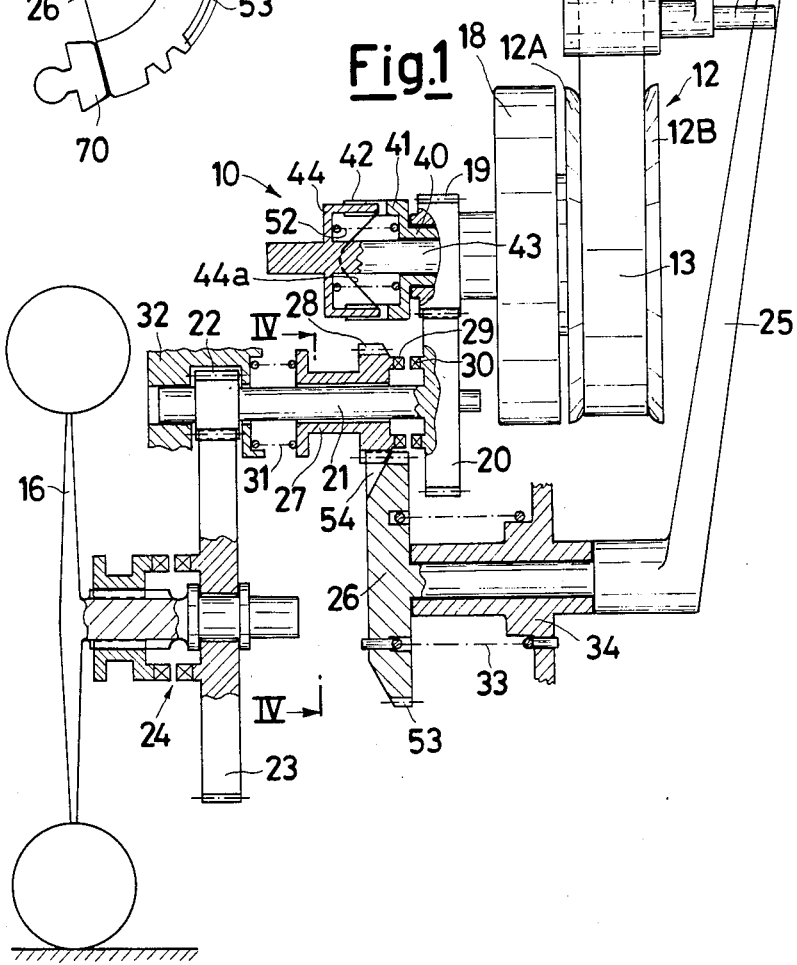
FIG. 1 shows a sectional view of a transmission unit according to the invention.
FIG. 4 shows a sectional view according to path IV—IV of the transmission unit of FIG. 1.
Figure 2:
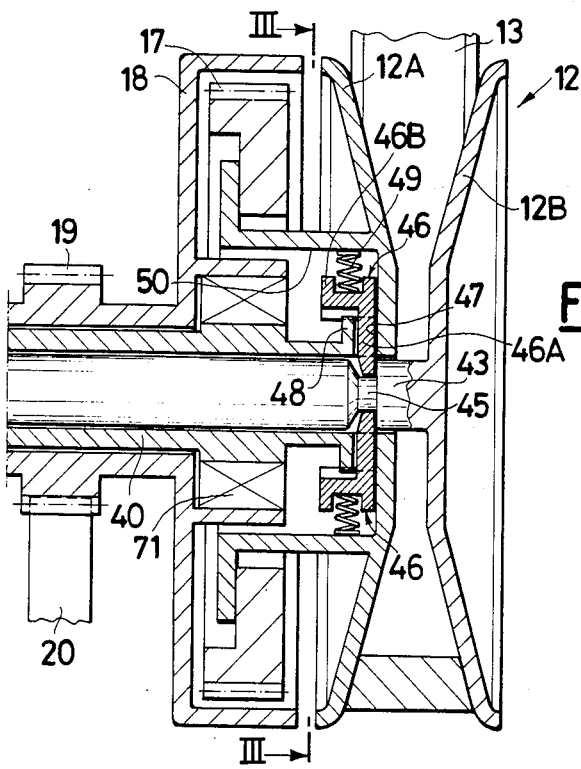
FIG. 2 shows an enlarged detail of the transmission unit of FIG. 1.

The transmission unit illustrated in FIG. 1, generally indicated with 10, intended for use on two-wheelers, comprises two pulleys 11 and 12 kinematically connected by a transmission belt 13. is per se known. In particular, pulley 11, denominated "driving pulley", is directly connected with the vehicle engine, not shown, through a shaft 14; it is constituted by two half-pulleys, viz., an axially fixed half-pulley 11B and a half-pulley 11A axially movable relatively to half-pulley 11B, the mutual distance between the two half-pulleys being controlled by means of a centrifugal regulator 15, which acts on half-pulley 11A, to the purpose of changing the transmission ratio between the two pulleys 11 and 12. The pulley 12, denominated "driven pulley", is, on the contrary, kinematically connected with the wheel 16 of the vehicle; it too is constituted by two half-pulleys, i.e., an axially fixed half-pulley 12A and a half-pulley 12B axially movable relatively to half-pulley 12A.

As regards the above-said kinematic connection between pulley 12 and wheel 16, the half-pulley 12A is connected, through an automatic clutch 17 of known types, with a drum 18 coaxial with it, which is provided with a crown gear 19; the crown gear 19 inmeshes with a gearwheel 20 rigidly linked, by means of a shaft 21, with a gearwheel 22; the gearwheel 22 inmeshes with a gearwheel 23 connected with the wheel 16 by means of a frontal coupling/disengagement unit 24 of known type, driven by the gearshift, not shown, of the vehicle.

The transmission unit 10 is equipped with a start-up device which comprises a pedal actuation lever 25, hinged onto a stationary portion 34 of transmission unit 10, rigidly connected with a crown gear 26.

The crown gear 26 inmeshes, in the way as it shall be seen hereunder, with a pinion gear 27 slidingly mounted on shaft 21. The pinion 27 is provided with a crown gear 28 suitable to inmesh with the sector gear 26 and is furthermore provided with a frontal toothing 29 suitable to inmesh with a corresponding frontal toothing 30 of gearwheel 20. On pinion 27 elastically biases, in direction of the gearwheel 20, a spring 31 which acts on a stationary portion of the transmission unit 10.

The lever 25 is kept in a determined rest position by a return spring 33 which acts on sector gear 26 and reacts on the stationary portion 34. In its above said rest position, the lever 25 keeps in a determinate inoperative position a substantially "C"-shaped lever 35, by acting on a stud 36 integral with the lever 35, which comes to stop against the same lever 25. Onto an end of lever 35 a roller 37 is rotatably mounted, which is positioned in correspondence of one of the two stretches of belt 13, externally to it; the other end of lever 35 is hinged onto a stationary portion 38 of the transmission unit 10; on the lever 35 a spring 39 acts, which reacts on the said portion 38.

The half-pulley 12A is integral with a tubular element 40 positioned along the axis of the same pulley 12A, and ends into a cam constituted by a sleeve 41 having a rim 42 with a curvilinear broken profile: in FIG. 1, only a half of said profile is visible, the other half being identical. The tubular element 40 is connected to the drum 18 through an idle wheel 71. The half-pulley 12B is integral with a shaft 43 coaxially and freely-rotatably mounted inside the tubular element 40; the shaft 43 ends with a sleeve 44 having a curvilinear profile 44a corresponding to the profile of rim 42: during a motion of relative revolution of the two sleeves 41 and 44, the profile 44a runs on portions of rim 42 having the same profile. Between the two sleeves 41 and 44 a spring 52 is interposed, which tends to keep united the two half-pulleys 12A and 12B.

Figure 3:
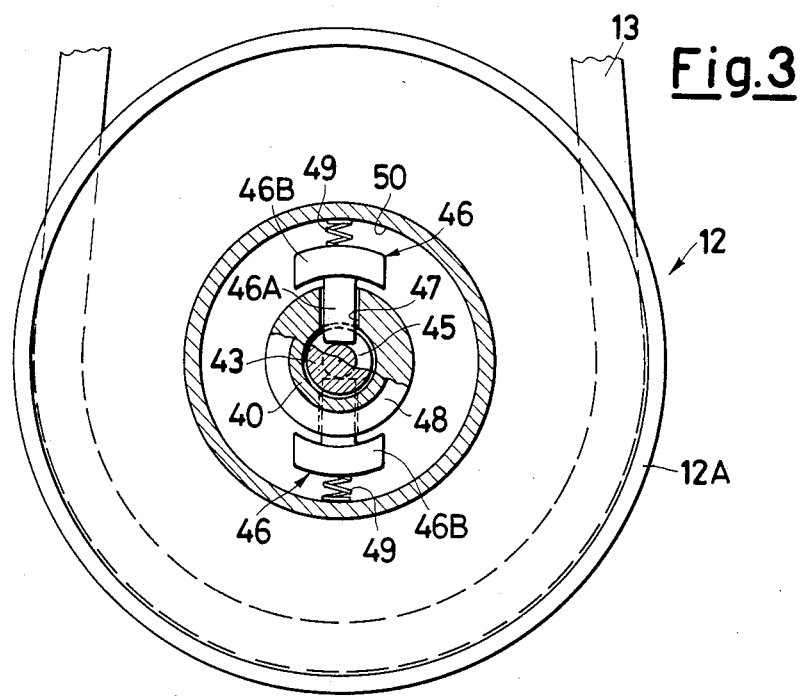
FIG. 3 shows a sectional view according to path III—III of FIG. 2.

On shaft 43 a ring slot 45, orthogonal to the axis of the same shaft, is provided. Inside the slot 45 two "T"-shaped elements 46, opposite to each other, come to engage themselves; the shank 46A (FIG. 3) of each element 46 is slidingly housed inside a radial seat 47 of a flange 48 of the tubular element 40, which rests against one face of half-pulley 12A, whilst on head 46B, which bears the masses, of each element 46, radially active is a spring 49, which reacts against a ring wall 50 integral and coaxial with the half-pulley 12A.

The starting-up of vehicle's engine by means of the transmission unit 10 as above disclosed occurs as follows.

The pedal lever 25 is driven to rotate (by applying a thrust to lever 25 towards the sheet, looking at FIG. 1). This action causes, due to reasons which are seen in the following, the pinion 27 to slide towards the gearwheel 20 by being pushed by the spring 31, and hence the mutual inmeshing of the two frontal toothings 29 and 30. This action causes furthermore the lever 35, not any longer constrained by the lever 25, to rotate, by being pushed by the spring 39, until roller 37 comes to press against the related belt stretch.

The start-up torque applied to sector gear 26 is transmitted to shaft 14 and then to vehicle's engine through pinion 27, gearwheels 20 and19, drum 18, idle wheel 71, tubular element 40 and then half-pulley 12A, belt 13 and half-pulley 11B.

The pressure of roller 37 on the related stretch of belt 13 allows the slack of the belt, deriving from the reversing of the operating stretches of the same belt, to be nullified; obviously, the belt stretch onto which the roller 37 insists, is the one which results in slack during the normal operation of the belt as the means for transmitting the driving torque from shaft 14 to wheel 16. Suitably, roller 37 should come into contact with the related stretch of belt 13 after a minimum length of stroke of lever 25, for the purpose of obtaining the longest possible fraction of useful stroke of pedal lever 25 and of eliminating, at the same time, the unpleasant feeling caused by the idle running of the same pedal lever 25.

The wedging of belt 13 between the half-pulleys 12A and 12B is avoided thanks to the preventing of half-pulley 12B from translating relatively to half-pulley 12A, due to the fact that the "T"-shaped elements 46, in the absence of an adequate centrifugal force, come to position themselves, by the thrust applied by springs 49, with the end of their shank 46A inside the slot 45, i.e., in a position of mutual constraint of the two half-pulleys.

With the engine running, the revolution speed of driven pulley 12 shall be such as to generate on the "T"-shaped elements 46 centrifugal forces of intensity high enough to overcome the action of springs 49 and thus disengage said elements from said slot 45, so to allow the half-pulley 12B to freely axially translate relatively to half-pulley 12A.

During this start-up action, the frontal coupling-/disengagement unit 24 must be, by being controlled by the gearshift, in such a position as to keep wheel 16 disengaged from transmission unit 10.

On lever 25 being released, after engine start-up, the same lever returns to its rest position due to action of spring 33, in which position the sector gear 26 stops against a stop element 70 (FIG. 4). To such a returning of pedal lever 25 the getting of pinion 27 spaced apart from gearwheel 20, and hence the disengaging of toothing 29 from toothing 30 corresponds, so as th lever 27 to be disengaged from motion transmission elements. The taking away of pinion 27 is obtained thanks to a special configuration of the section gear 26; such a sector gear 26 is in fact provided with a peripheral toothed portion 53 (FIG. 4), suitable to inmesh with the crown gear 28 of pinion 27, which ends with a tooth-free portion 54 having suitably inclined surfaces for contact with the teeth of the crown gear 28 in such a way that, during the rotation of sector 26 and crown 28 relative to each other, when such teeth come into contact with such a portion 54, an axial leftwards—looking at FIG. 1—thrust is obtained on pinion 27. The angular position of sector gear 26 is such that in the initial length of stroke of lever 25, the portion 54 is in contact with the teeth of crown gear 28, so to keep pinion 27 spaced apart from gearwheel 20, whilst along the residual length of stroke, the teeth of the toothed portion 53 of sector gear 26 inmesh with the teeth of crown 28 and pinion 27 slides rightwards, getting coupled with gearwheel 20; when lever 25 returns back to its rest position, the portion 54 comes back into contact with the teeth of crown gear 28, so to cause pinion 27 to shift leftwards.

In the transmission of driving torque from shaft 14 to wheel 16, the particular mutual coupling of sleeves 41 and 44 allows the mutual tightening of half-pulleys 12A and 12B to be modulated as a function of required load. In this way, sleeves 41 and 44 shall shift axially relative to each other.

Figure 5:
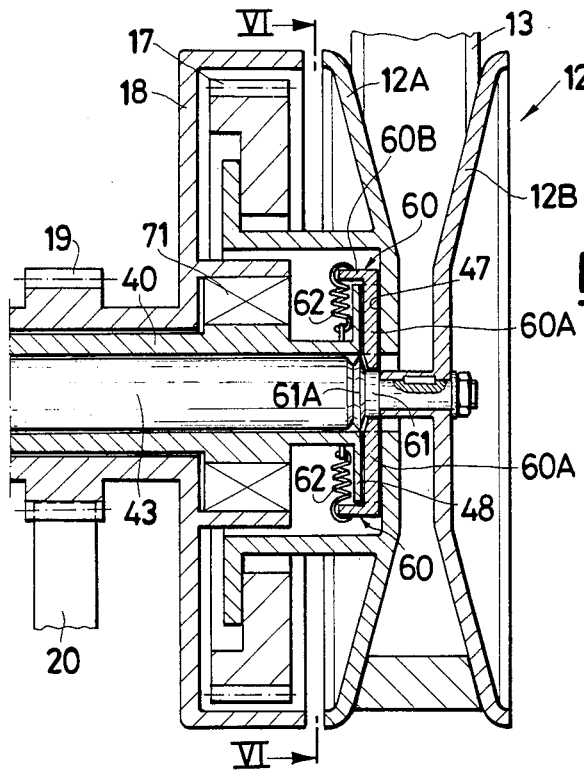
FIG. 5 shows a variant form of practical embodiment of the detail of FIG. 2.
Figure 6:
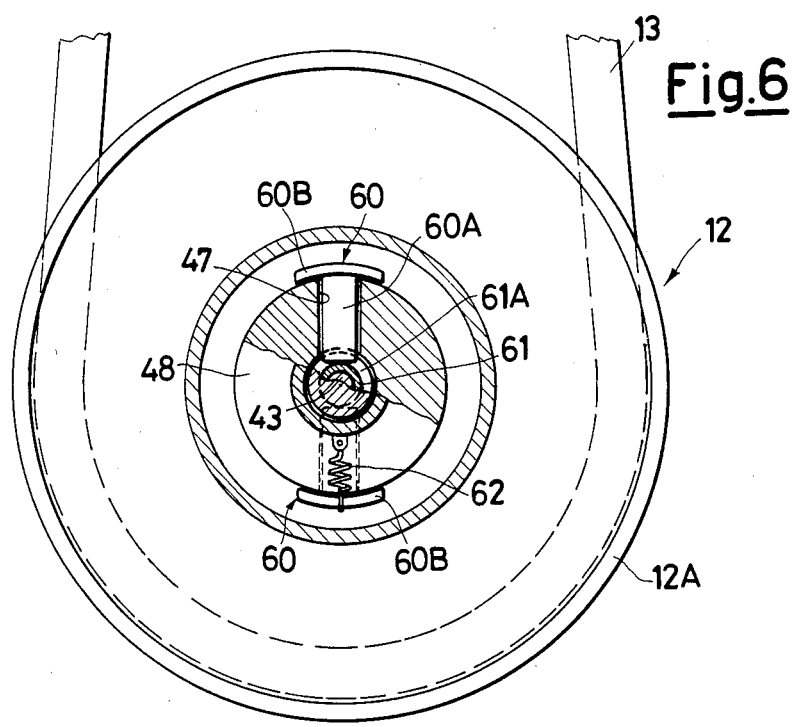
FIG. 6 shows a sectional view according to path VI—VI of FIG. 5.

FIGS. 5 and 6 show a variant of practical embodiment of the device designed to prevent the axial shift of half-pulley 12B relative to half-pulley 12A. Two "T"-shaped elements opposite to each other are always provided; they are indicated, in this case, with 60; each of them has a shank 60A sliding inside the radial seat 47 of flange 48 of tubular element 40. But such "T"-shaped elements 60 engage themselves with a sleeve 61 rigidly and coaxially fastened onto shaft 43, suitably modified so to be able to house such sleeve; in particular, the end of each shank 60A engages itself, by a protrusion 61A, with conical surfaces of sleeve 61. Another difference relatively to the previous shift-preventing device relates to the springs, each of which, in this case, wherein it is indicated with 62, is anchored, in correspondence of one of its ends, onto the head 60B of the respective element 60, and, in correspondence of its other end, onto the tubular element 40. The springs 62 apply a tensile force to the element 60, instead of a thrust, as applied by the springs 49 of the above device, to the purpose of keeping the same elements 60 in their position of engagement with the sleeve 61.

The operating way of this device is analogous to the operating way of the previously disclosed device. The wedging of belt 13 between half-pulleys 12A and 12B at start-up time is avoided thanks to the fact that, in the absence of an adequate centrifugal force, the springs 62 keep the elements 60 in such a position that the ends of their shanks 60A constitute shoulder elements for the ring protrusion 61A of sleeve 61, preventing half-pulley 12B from moving apart from half-pulley 12A. With increasing speed of pulley 12, the elements 60 get spaced apart, by centrifugal force, from said position, not interfering any longer with the protrusion 61A of sleeve 61, allowing the half-pulley 12B to slide away from half-pulley 12A. The ends of shanks 60A and the protrusion 61A have sliding surfaces opposite to each other of inclined shape, which facilitate the moving away of elements 60 from their constraint position.

For such lock devices other variants can be provided, on condition that they comprise at least one locking element which moves, with increasing centrifugal force, from a position wherein it constrained the two half-pulleys, to a disengagement position.

Furthermore, other jockey elements may be provided too, equivalent to the one as illustrated, always controlled by the engine start-up device.

I claim:

1. Belt transmission unit for vehicles provided with an engine start-up system comprising a driving pulley and a driven pulley connected to each other by means of a transmission belt, each of said pulley including two half-pulleys axially movable relative to each other, actuation means for engine start-up including a transmission belt tightening element for tightening said transmission belt, said actuation means being kinematically connected for revolution with one of said two half-pulleys of said driven pulley and being connected with said tightening element such that in the position of engine start-up said actuation means actuates said tightening element to tighten said transmission belt, said actuation means including at least one rotatable lock element radially slidable by centrifugal force relative to one of said two half-pulleys of said driven pulley, said lock element restrains said driven half-pulleys against axial movement relative to each other in the absence of centrifugal force, and said lock element moves radially in response to increasing values of centrifugal force to permit axial movement of said driven half-pulleys relative to each other.

2. Belt transmission unit according to claim 1, wherein said tightening element comprises a lever carrying a pressure roller, said lever being movable between a position of contact of said pressure roller with said transmission belt and a spaced apart position, elastic means acting on said lever for holding said pressure roller in said contact position, and said act means interfering with said lever to keep said lever in said spaced apart position in non-start-up position, and to release said lever in the start-up position.

3. Belt transmission unit according to claim 2, wherein said lever is rotatably movable between a stroke-beginning rest position and a stroke-end position.

4. Belt transmission unit according to claim 1, wherein said lock element is mounted in a tubular element axially integral with one of the two half-pulleys of said driven pulley, a shaft integral with the other half-pulley of the driven pulley being coaxially within said tubular element, and said lock element engaging said shaft in said position of restraint.

5. Belt transmission unit according to claim 4, wherein elastic means are provided for acting on said lock element in the opposite direction relative to the centrifugal force.

6. Belt transmission unit according to claim 5 wherein said lock element comprises a head onto which said elastic means react, and a foot engageable with said shaft.

7. Belt transmission unit according to claim 6, wherein said elastic means is a spring which acts on said lock element head and reacts on a wall integral with one of the two driven half-pulleys.

8. Belt transmission unit according to claim 6, wherein said elastic means includes a spring anchored at opposite ones of its ends to said head and to said tubular element respectively.

9. Belt transmission unit according to claim 6, wherein said foot is slidingly mounted inside a seat of said tubular element.

10. Belt transmission unit according to claim 6, wherein said shaft is provided with a ring groove in which said lock element enters in said position of restraint.

11. Belt transmission unit according to claim 10, wherein elastic means biasing said pinion into said coupling position.

12. Belt transmission unit according to claim 5, wherein said shaft is provided with a ring protrusion against which said lock element abuts in said position of restraint.

13. Belt transmission unit according to claim 4 wherein said shaft is provided with a peripheral groove in which said lock element seats in said position of restraint.

14. Belt transmission unit according to claim 4 wherein said shaft is provided with a radially outward directed protrusion against which said lock element abuts in said position of restraint.

15. Belt transmission unit according to claim 4, wherein said lock element engages said shaft along two shaft surfaces opposite to each other and inclined relative to the axis of the shaft.

16. Belt transmission unit according to claim 1, including a second lock element corresponding to structure and function to said one lock element and being positioned radially opposite thereto.

17. Belt transmission unit according to claim 1, wherein said actuation means comprises a lever rotatably movable between a stroke-beginning rest position and a stroke-end position.

18. Belt transmission group according to claim 17, wherein said lever is connected to a half-pulley of the driven pulley through gear means.

19. Belt transmission unit according to claim 14 wherein said gear means comprises a gear sector carried by said lever, a rotatable pinion having a first set of teeth in contact with said gear sector in a first relative position thereof for maintaining a second set of said rotatable pinion out of engagement with a further gear of said gear means, said further gear being in driving connection with said half-pulley of said driven pulley, and said gear sector being movable by said lever to a second position relative to said rotatable pinion at which said rotatable pinion second teeth are in meshing engagement with said further gear.

20. Belt transmission unit according to claim 1 including a pressure modulator associated with said driven pulley, and said modulator being provided with two sleeves respectively integral with the two half-pulleys of the driven pulley and having a respective mutually engageable cam-shaped frontal profiles.

* * * * *